Dec. 8, 1959  F. G. BURG  2,915,923
POWER FEED MECHANISM FOR MACHINE TOOLS
Filed Jan. 28, 1957  3 Sheets-Sheet 1
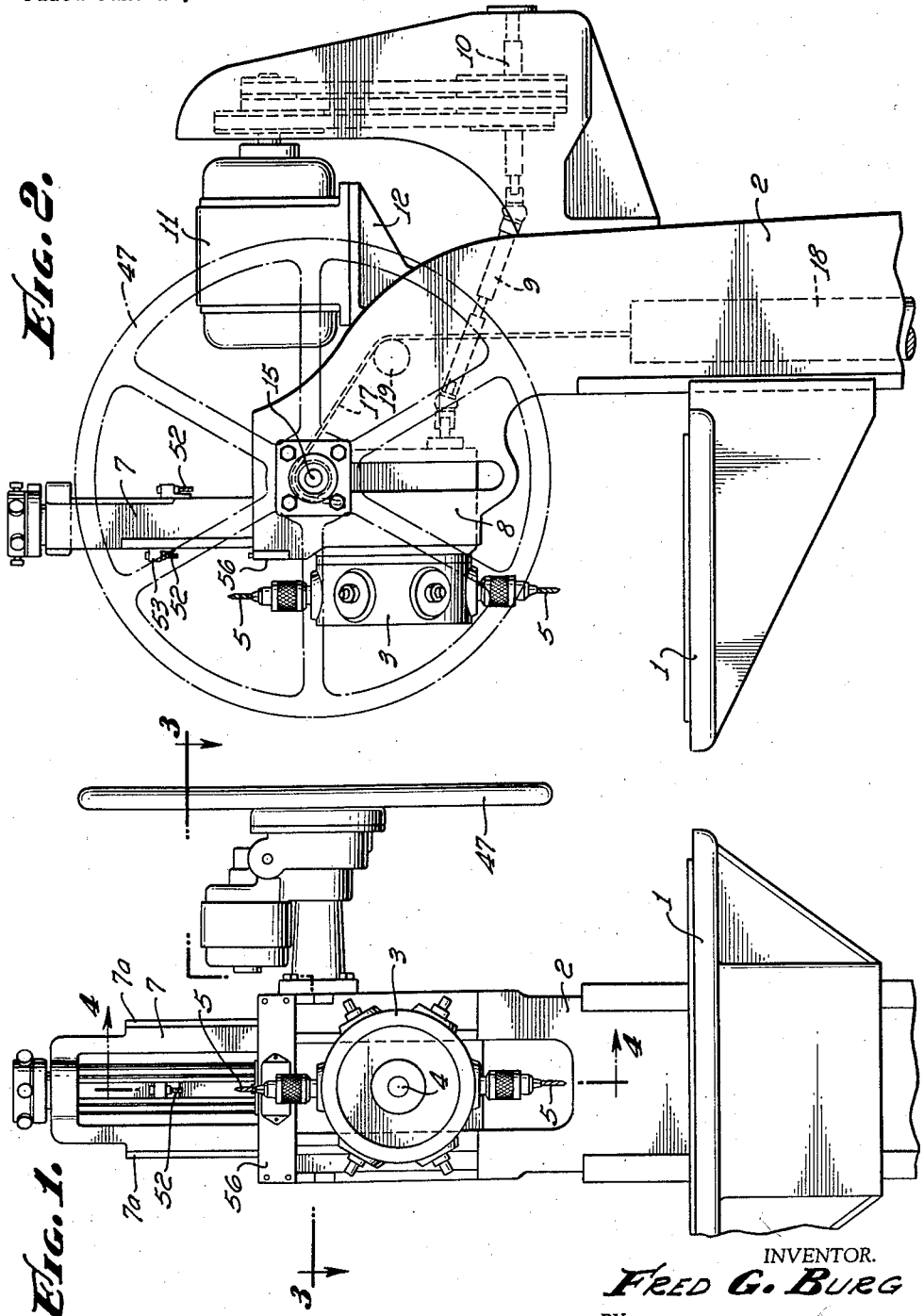
INVENTOR.
FRED G. BURG
BY
Flam and Flam
ATTORNEYS.

Dec. 8, 1959      F. G. BURG      2,915,923
POWER FEED MECHANISM FOR MACHINE TOOLS
Filed Jan. 28, 1957      3 Sheets-Sheet 2
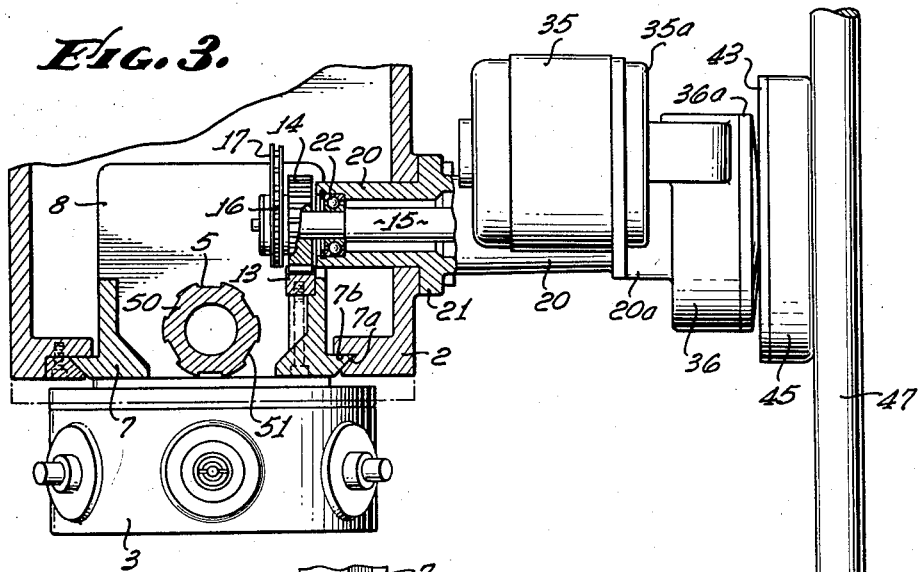
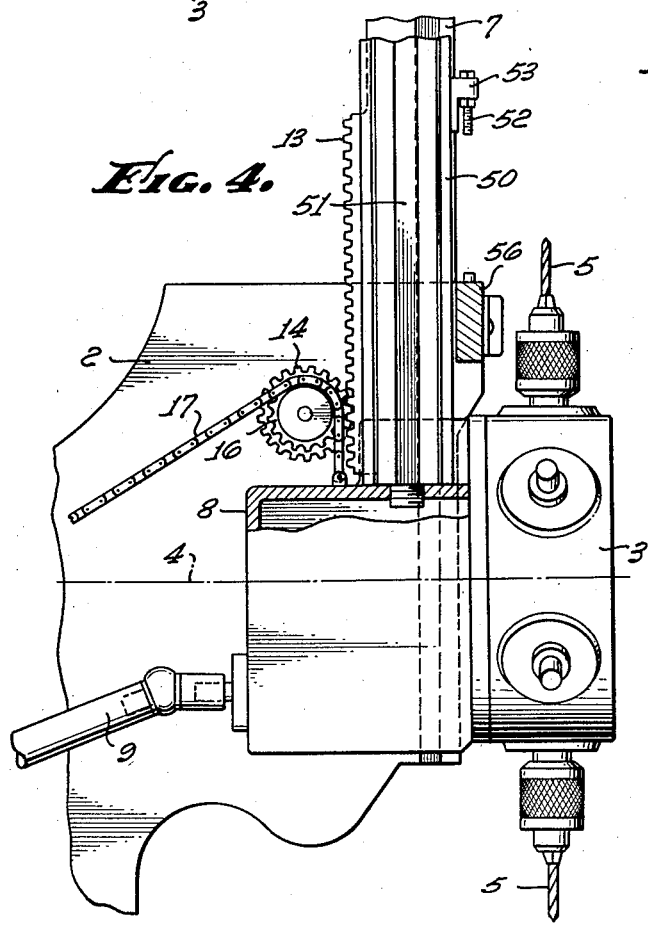
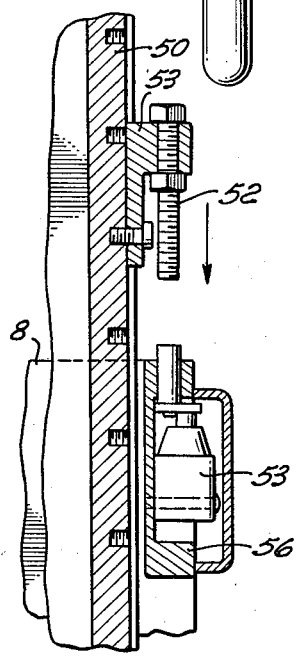
INVENTOR.
FRED G. BURG
BY
Flam and Flam
ATTORNEYS.

Dec. 8, 1959 F. G. BURG 2,915,923
POWER FEED MECHANISM FOR MACHINE TOOLS
Filed Jan. 28, 1957 3 Sheets-Sheet 3

FRED G. BURG
INVENTOR.

BY Flam and Flam
ATTORNEYS.

United States Patent Office 2,915,923
Patented Dec. 8, 1959

2,915,923
POWER FEED MECHANISM FOR MACHINE TOOLS

Fred G. Burg, Los Angeles, Calif.

Application January 28, 1957, Serial No. 636,761

7 Claims. (Cl. 77—25)

This invention relates to machine tools, and particularly to the feed mechanisms for such tools. The invention may, for example, be utilized in tools such as disclosed in United States Letters Patent No. 2,670,636, issued March 2, 1954, as well as in other types.

It is one of the objects of this invention to provide a power drive of simple construction that may be optionally rendered effective to supplant a manual feed mechanism.

It is another object of this invention to provide an electric motor-operated feed mechanism that can be readily installed on existing machines.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a front elevation of a machine tool incorporating the invention;

Fig. 2 is a side view thereof, the handwheel for optional hand feeding being shown in phantom lines;

Figure 6:
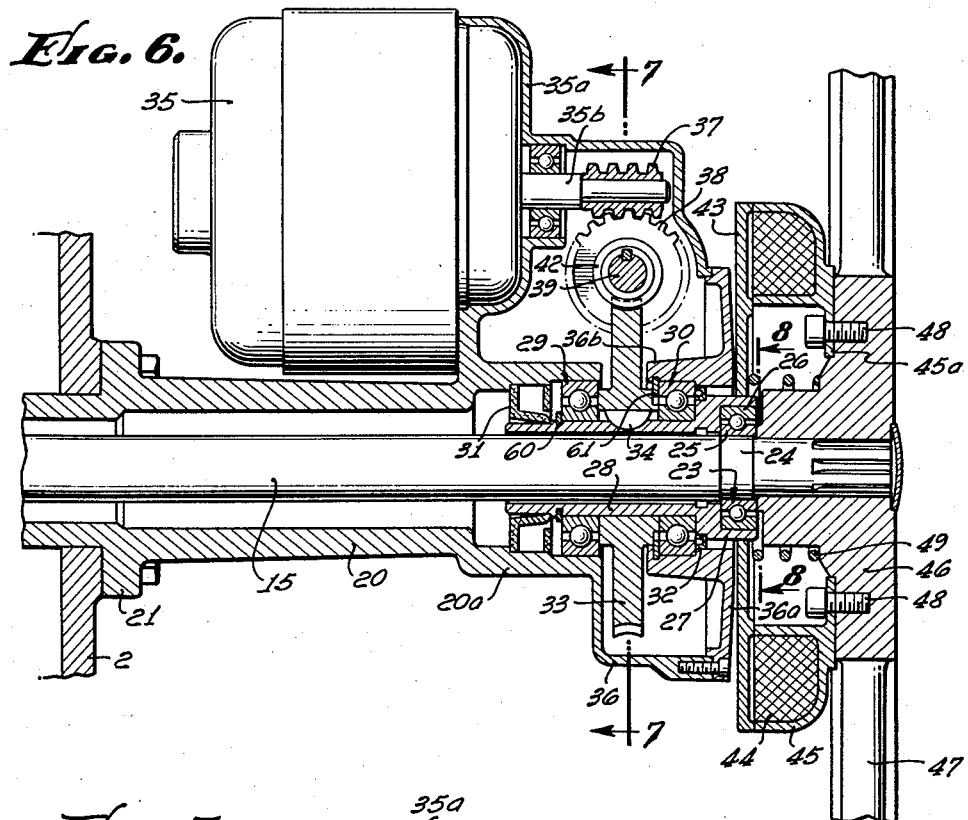
Figure 7:
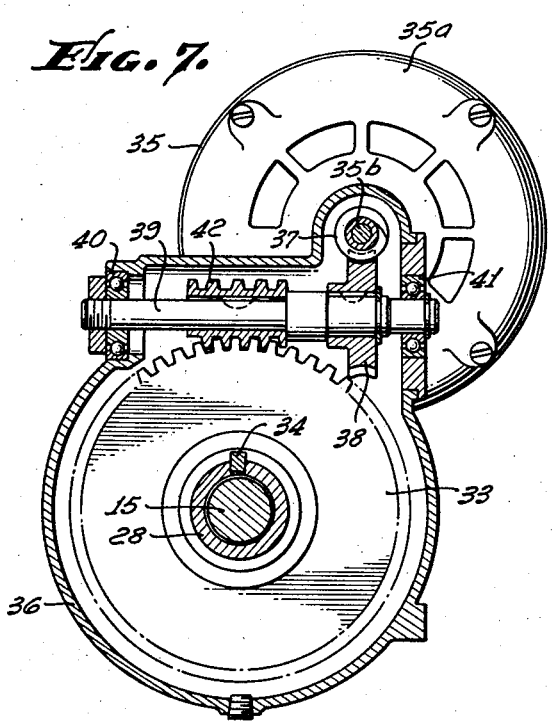
Figure 8:
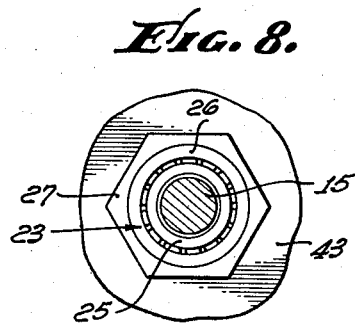

Figs. 3 and 4 are enlarged sectional views taken along planes corresponding to lines 3—3 and 4—4 of Fig. 1;

Fig. 5 is a fragmentary enlarged view, similar to Fig. 4, illustrating the operation of a circuit controller for controlling the power feed;

Fig. 6 is a longitudinal section illustrating the main elements of the power feed mechanism; and Figs. 7 and 8 are sectional views taken along planes corresponding to lines 7—7 and 8—8 of Fig. 6.

In the present instance, the invention is shown as incorporated in a turret drill mechanism, such as described and claimed in Patent No. 2,670,636 hereinabove referred to. This tool includes a vertically adjustable work table 1 (Figs. 1 and 2) mounted on a main frame 2 in any appropriate manner. This main frame 2 may be formed as a hollow casting. The work table 1 may be so arranged as to support work upon which a drilling or reaming operation is to be performed and the work is appropriately clamped to the upper surface of table 1.

The turret comprises a head 3 (Figs. 1, 2 and 3) mounted for angular adjustment about a horizontal axis 4. This angular adjustment serves to position in succession, a number of rotary tools 5, into operative relation to the work. Two of these tools are shown in Figs. 1 and 3, but there are provisions in this instance for mounting four other tools. The downwardly extending tool 5 (shown as a drill) is in position to operate on the work.

As shown most clearly in Figs. 3 and 4, the head 3 is mounted on a vertically movable carriage 7. This carriage 7 has dovetail guiding edges 7a engaging grooves 7b formed in the frame 2. The carriage 7 carries a gear box 8 (Figs. 2 and 4) at its rear end, provided to transmit power to the rotary tools 5. The power is supplied, in this instance, from a shaft structure 9 coupled to a shaft 10 (Fig. 2) rotated by an electric motor 11, and the speed of rotation may be adjusted to suit the particular active tool. Electric motor 11 is mounted on a bracket 12 attached to the frame 2. A power transmission of this character is described in United States Patent No. 2,767,598, issued on October 23, 1956, to Fred G. Burg.

Movement of the carriage 7 in its guide, to feed the tool to the work, is effected by a rack and pinion mechanism. Thus, the carriage 7 at its rear carries a rack 13 (Fig. 3). This rack is adapted to be engaged by a spur gear 14 (Figs. 3 and 4) operated by a feed shaft 15. Rotatably mounted upon the shaft 15 is an idler sprocket wheel 16 which is engaged by a sprocket chain 17. One end of the sprocket chain 17 is attached to the carriage 7 via gear box 8. Its other end is attached to a weight 18 (Fig. 2) after passing over another idler wheel 19. The weight 18 counterbalances the weight of the carriage 7 and its associated parts.

The shaft 15, as most clearly shown in Figs. 3 and 6, extends through a hollow bracket 20 appropriately attached as by a flange 21 to the exterior of the frame 2. The left-hand end of the shaft 15 is rotatably supported by ball bearings 22 mounted in the left-hand end of the bracket 20. This left-hand end projects into the frame 2. The right-hand end of shaft 15 is likewise supported by the aid of a ball bearing structure 23. The inner race 25 of this ball bearing structure 23 is mounted on a reduced portion 24 of the shaft 15. The outer race 26 is supported within a noncircular flange 27 (see Fig. 8) formed at the end of a sleeve 28 surrounding the shaft 15. The sleeve is rotated, as hereinafter described, to provide power to shaft 15.

In the present instance, the flange 27 is shown as hexagonal and serves as a means for coupling the sleeve 28 to the shaft 15. Shaft 15 also carries a handwheel 47, as by being splined into the hub 46 of wheel 47.

The bracket 20 carries an integrally formed housing 36 defining a space in which sleeve 28 may be accommodated. The right end of this housing is open and may be covered by a removable cover member 36a. This cover member has a central opening to pass the flange 27 of sleeve 28. It also has an inwardly directed hub 36b, the end surface of which is spaced from the end of the annular enlargement 20a of bracket 20.

The sleeve 28 surrounding the shaft 15 is rotatably supported within the enlargement 20a and hub 36b by the aid of a pair of ball bearing structures 29 and 30 (Fig. 6). These ball bearing structures have outer races mounted respectively within the enlargement 20a and hub 36b. The inner races are mounted on the exterior of the sleeve 28. Appropriate split spring rings 60, 61 serve to hold the bearing structures against axial movement.

Sealing structures 31 and 32 are provided adjacent the opposite ends of the sleeve 28 and accommodated within enlargement 20a and hub 36b. In this way, ingress of foreign matter to the ball bearing structures is retarded.

Mounted between the bearing structures 29 and 30 is a worm gear wheel 33. It is keyed to the sleeve 28 by the aid of a Woodruff key 34. As shown most clearly in Figs. 6 and 7, the gear wheel 33 is driven by the aid of an electric motor 35 appropriately mounted on an end bell 35a formed integrally with housing 36. The shaft 35b of motor 35 operates a spiral worm 37 which meshes with a worm gear 38. The worm gear 38 is keyed to a countershaft 39. This countershaft is rotatably mounted as by the aid of ball bearing structures 40 and 41 (Fig. 7) supported on opposite walls of housing 36. This shaft 39 carries a worm 42 meshing with the gear 33. In this way, a large reduction in speed is obtained between the motor 35 and the sleeve 28.

The manner in which rotation of sleeve 28 is effective to rotate shaft 15 will now be described.

The hexagon-shaped flange 27 interfits a central aperture of an armature 43. This armature 43, shown most clearly in Fig. 6, forms one element of an electromagnetic clutch structure. The other element of the clutch structure includes the coil 44 supported within a magnetic shell 45. This shell 45 is fastened to the hub 46 of handwheel 47. This is accomplished by the aid of the screws 48 passing through flange 45a of shell 45. When the clutch parts are effective, rotation of the motor 35 is effective to rotate the hub 46; and rotation of the hub 46 serves to impart rotation to the shaft 15 and thence to impart vertical movement to the rack 13.

Normally a compression spring 49 urges the armature 43 to the left, as viewed in Fig. 6, against cover 36a, so as to be free of the clutch element 45. However, when the motor 35 is operating, and the coil 44 is energized, the armature 43 attains the attracted position of Fig. 6. Rotation of the sleeve 28 in response to the energization of motor 35 serves to rotate the armature 43 through the noncircular engaging coupling elements of flange 27 and armature 43. Since the clutch coil 44 is energized, the hub 46 is rotated and thereby the shaft 15.

The carriage 7 provides a rotatable support for a vertical hollow spindle 50 (Figs. 3, 4 and 5). This spindle 50 has as many longitudinal slots 51 as there are angular positions of the tool head 3. When the tool head 3 is rotated through an angle, the spindle 50 is likewise rotated through the same angle. Adjustably mounted in each slot 51 is circuit controller actuator 52. Several of these actuators are indicated in Figs. 2, 4 and 5. These actuators are in the form of adjustably mounted studs carried on brackets 53 adjustably mounted within the slots 51.

After the carriage 7 is moved downwardly to a desired level, the actuator 52 serves to operate a circuit controlling switch 53 (Fig. 5). This switch is mounted on the transverse bar 56 extending across the frame 2. The circuit controlling switch 53 serves to deenergize the motor 35 and the coil 44. The tool can then be retracted by manual operation of the handwheel 47, or else circuits may be completed to reverse rotation of the motor 35.

The inventor claims:

1. In a feed mechanism for advancing a machine tool toward work: a movable machine tool carriage; an actuator for moving the carriage; a shaft for operating the actuator; a sleeve mounted for free rotation with respect to the shaft, said sleeve and shaft having a common axis; an electric motor drive for the sleeve; an electric clutch structure having first and second clutch elements; and a manual operator connected to the shaft; said first element being secured to the manual operator; the second element being in driving relation to the sleeve; said electric clutch structure being energizable independently of the manual operator.

2. In a power feed mechanism for relative movement of a tool and work: a shaft; a tool feed actuator operated by the shaft; a rotary sleeve surrounding the shaft; an electric motor drive for the sleeve; an electric clutch structure having first and second clutch elements, the first element being secured to the shaft, and the second element being in positive driving relation to the sleeve; and switch means responsive to the relative movement of the tool and the work for controlling energization of the motor and the clutch structure; said electric clutch structure being operable independently of the manual operator.

3. In a power feed mechanism for advancing a tool relative to work: a tool carrier; an actuator for the tool carrier; a shaft for driving the actuator; a sleeve surrounding the shaft; means rotatably supporting the sleeve independently of the shaft; an electric motor for driving the sleeve; an electric clutch member secured to the shaft and disposed around said shaft; an armature forming a cooperative clutch member, having a noncircular central aperture; and a coupling mounted on the sleeve and having a noncircular configuration for conforming to the armature aperture.

4. In a power feed mechanism for advancing a tool relative to work: a tool carrier; an actuator for the tool carrier; a shaft for driving the actuator; a sleeve surrounding the shaft; means rotatably supporting the sleeve independently of the shaft; an electric motor for driving the sleeve; a manual operator carried by the shaft; an electric clutch member secured to said operator and disposed around said shaft; an armature forming a cooperating clutch member, having a noncircular central aperture; and a coupling mounted on the sleeve and having a noncircular configuration for conforming to the armature aperture.

5. In a power feed mechanism for advancing a tool relative to work: a tool carrier; an actuator for the tool carrier; a shaft for driving the actuator; a sleeve surrounding the shaft; means rotatably supporting the sleeve independently of the shaft; an electric motor for driving the sleeve; an electric clutch member secured to the shaft and disposed around said shaft; an armature forming a cooperating clutch member, having a noncircular central aperture; a coupling mounted on the sleeve and having a noncircular configuration for conforming to the armature aperture; and switch means responsive to the arrival of the tool to a definite position for controlling the motor and the electric clutch member for terminating forward feed of the tool.

6. In a power feed mechanism to cause relative motion of a tool and work: a shaft; a feed actuator coupled to the shaft; a hollow bracket in which the shaft extends; bearing means supported by the bracket adjacent that end of the shaft which is coupled to the actuator; a rotary sleeve surrounding the shaft; a bearing structure for the sleeve and supported by said bracket; an electric motor for rotating the sleeve; manual means coupled to the shaft for rotating it; a first clutch member having an electromagnet coil, and surrounding the shaft and secured to the manual means; and a second clutch member cooperating with the first clutch member and operating as an armature for the first clutch member, said clutch member being coupled to the sleeve and axially movable into and out of operative relation with respect to the first clutch member.

7. The combination as set forth in claim 6, in which the coupling between the second clutch member and the sleeve is effected by a central non-circular aperture in the said second clutch member, and cooperating with a corresponding non-circular portion of the periphery of the sleeve.

References Cited in the file of this patent

UNITED STATES PATENTS

| | | |
|---|---|---|
| 2,141,465 | Grey | Dec. 27, 1938 |
| 2,209,776 | Kiekhaefer | July 30, 1940 |
| 2,269,064 | Rideout | Jan. 6, 1942 |
| 2,771,789 | Rossmann et al. | Nov. 27, 1956 |